Jan. 4, 1966    L. E. ERLEWINE    3,227,294
TRUCK BODY TRANSFER SYSTEM
Filed Dec. 20, 1962    11 Sheets-Sheet 1
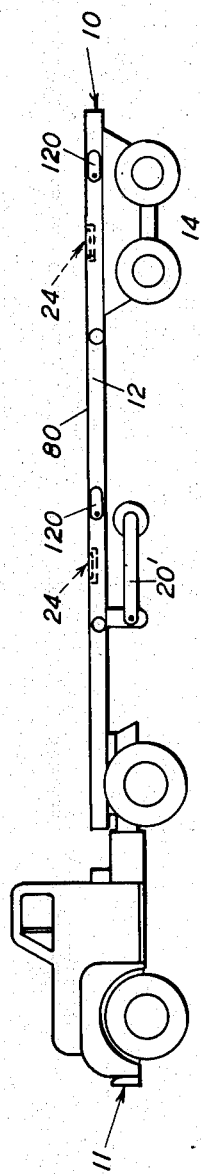
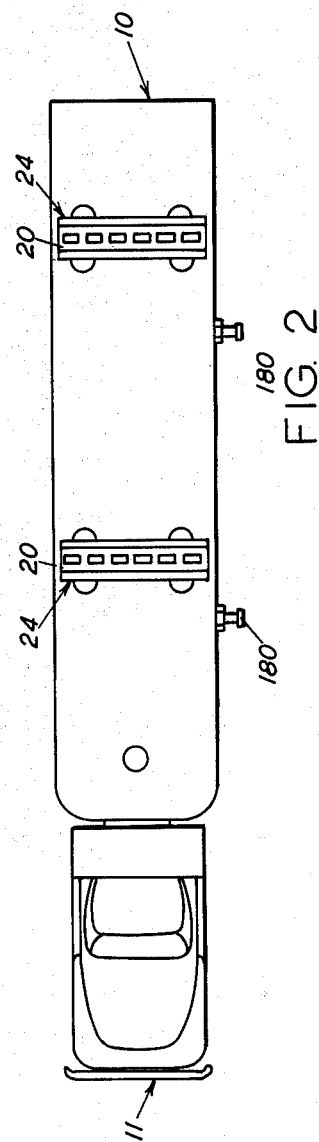
INVENTOR.
LESTER E. ERLEWINE
BY
Hiram A. Sturges
Agent Jan. 4, 1966 L. E. ERLEWINE 3,227,294
TRUCK BODY TRANSFER SYSTEM
Filed Dec. 20, 1962 11 Sheets-Sheet 2
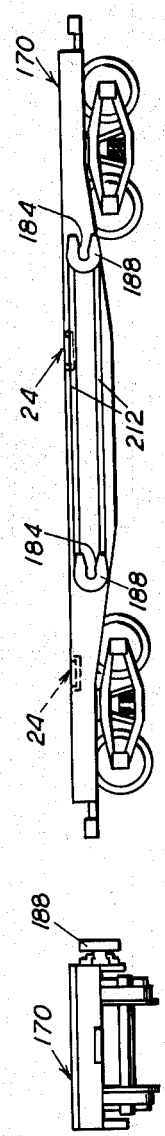
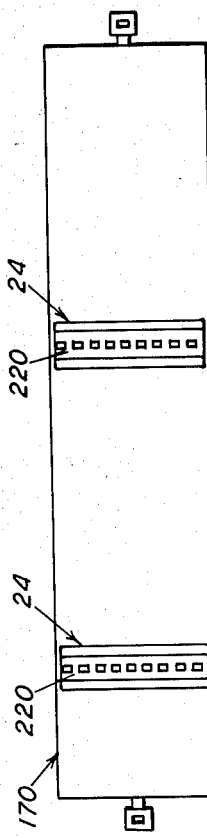
INVENTOR.
LESTER E. ERLEWINE

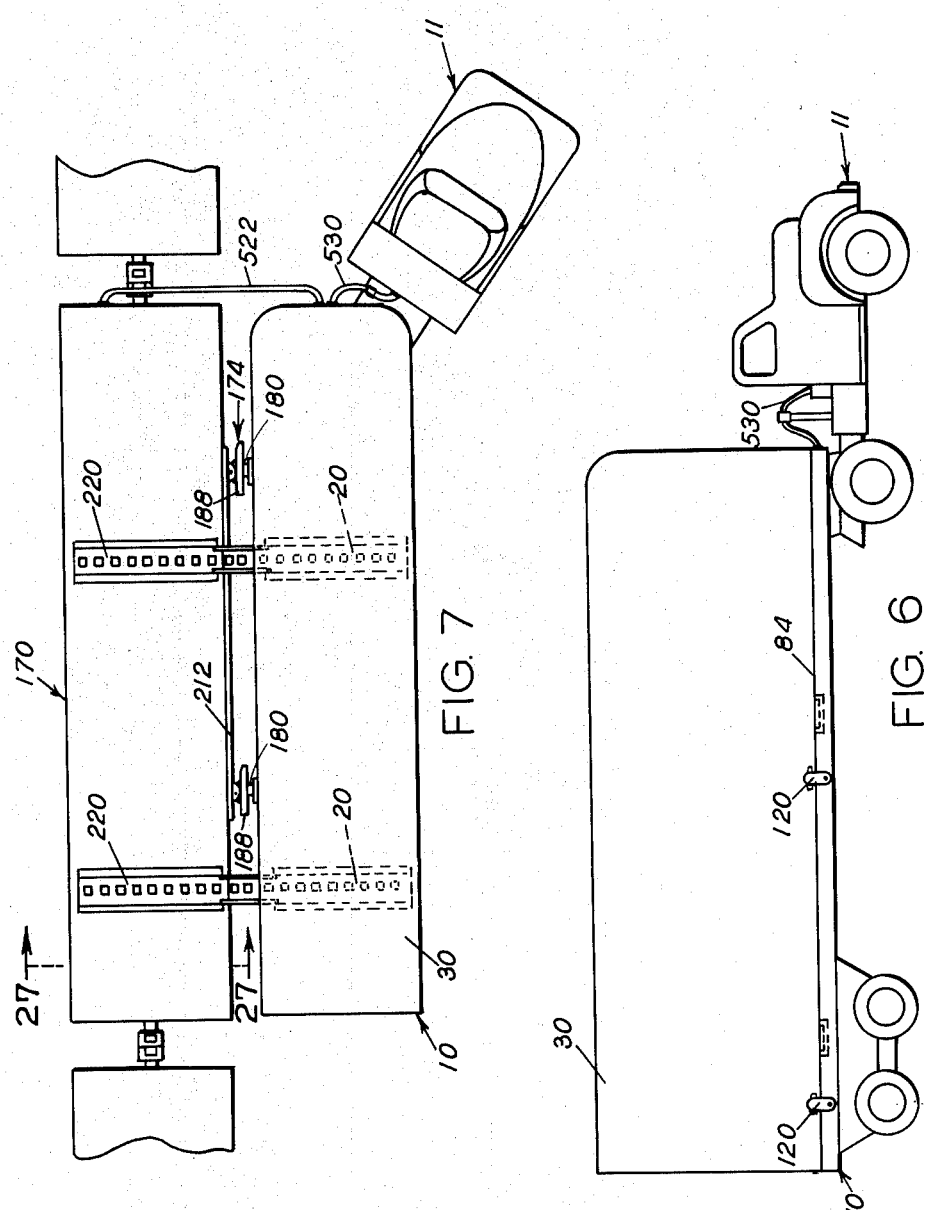

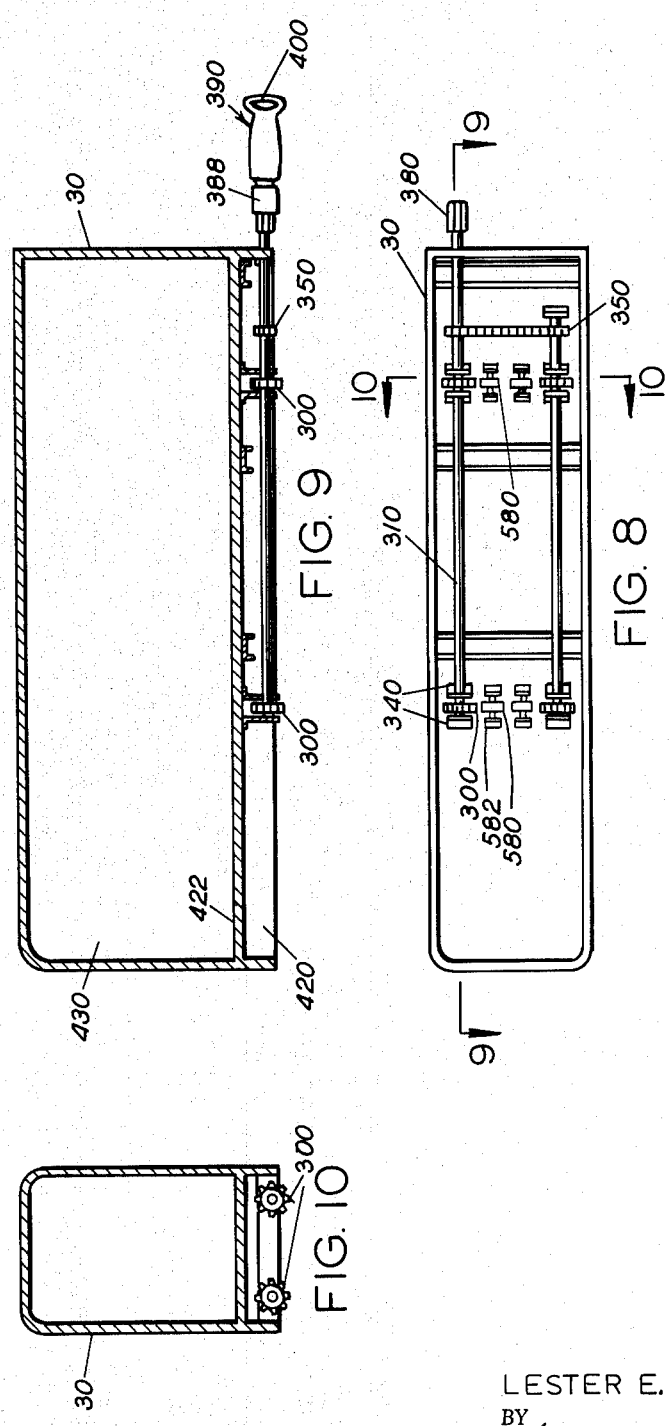

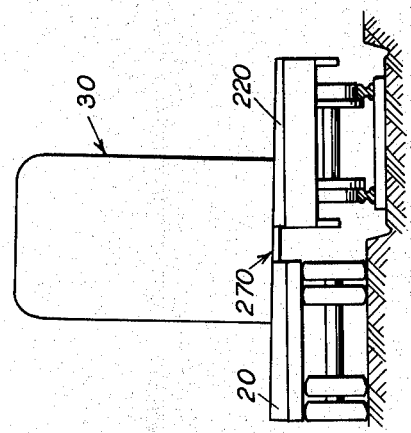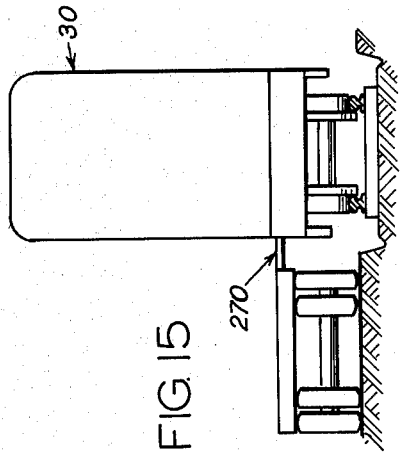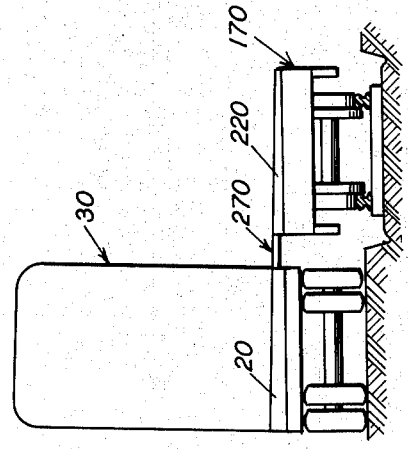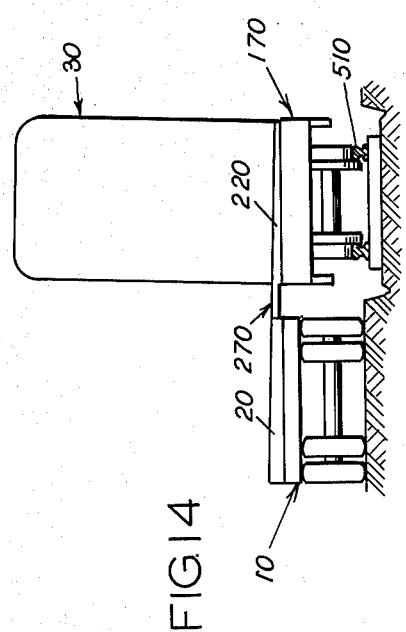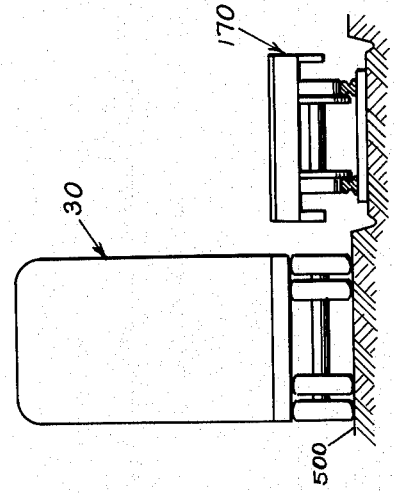

Jan. 4, 1966    L. E. ERLEWINE    3,227,294
TRUCK BODY TRANSFER SYSTEM
Filed Dec. 20, 1962    11 Sheets-Sheet 6
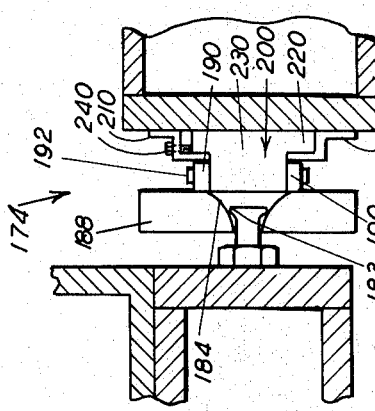
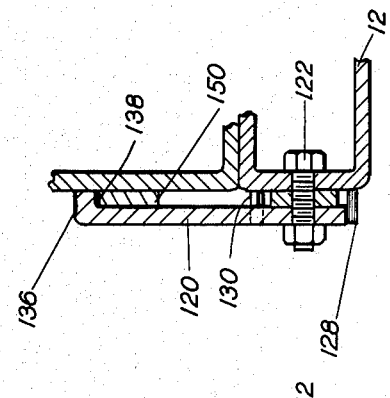
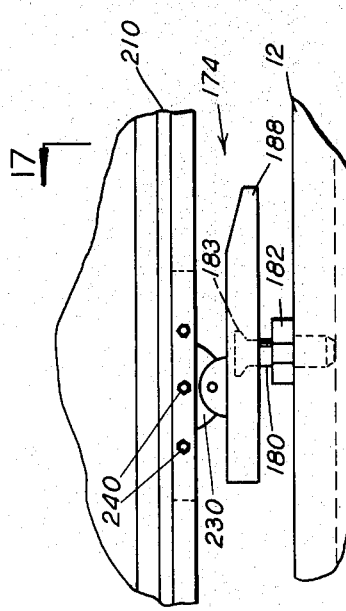
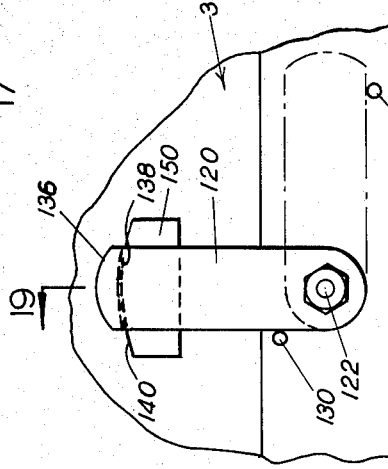
INVENTOR.
LESTER E. ERLEWINE
BY Hiram A. Sturges
Agent Jan. 4, 1966  L. E. ERLEWINE  3,227,294
TRUCK BODY TRANSFER SYSTEM
Filed Dec. 20, 1962  11 Sheets-Sheet 7
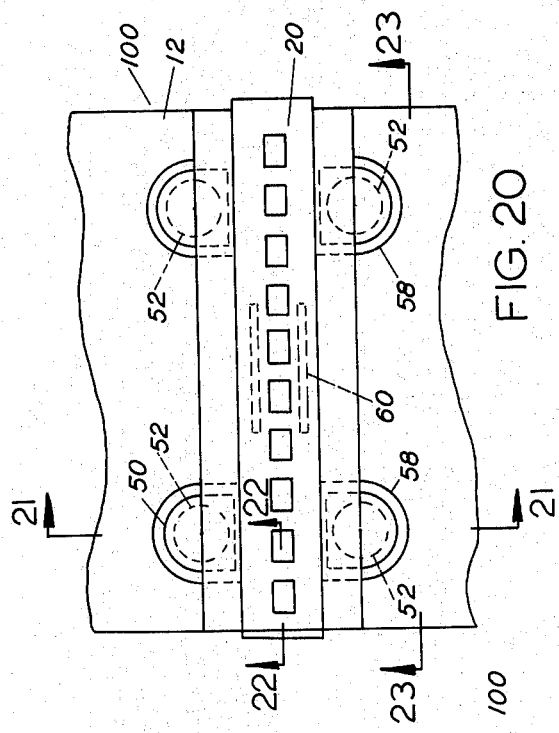
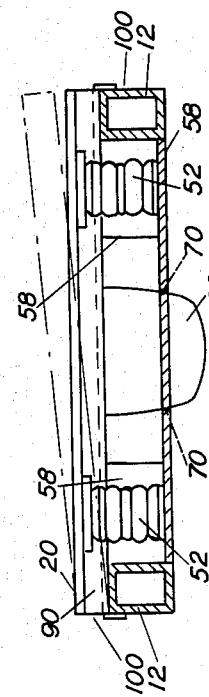
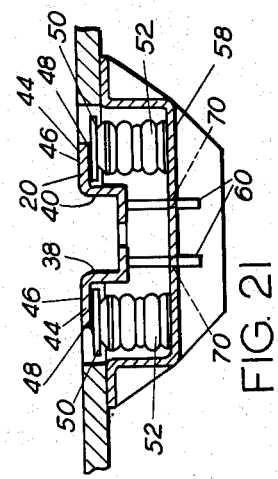
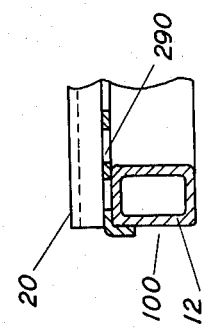
INVENTOR.
LESTER E. ERLEWINE
BY

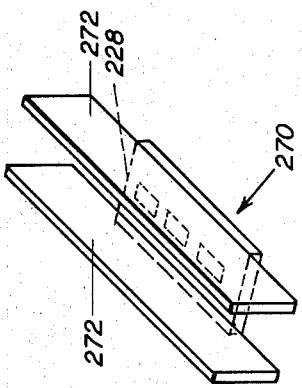
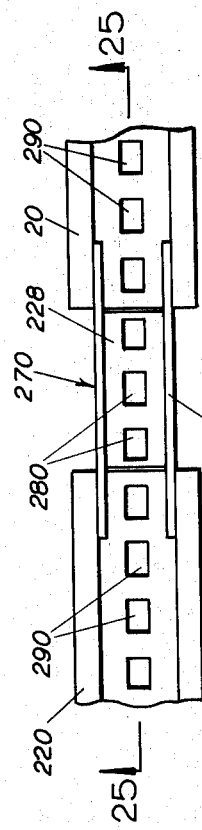
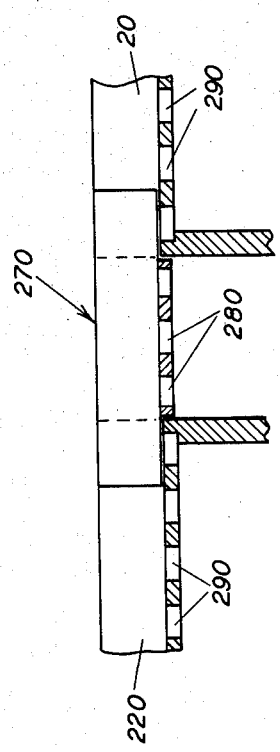

INVENTOR.
LESTER E. ERLEWINE

Jan. 4, 1966  L. E. ERLEWINE  3,227,294
TRUCK BODY TRANSFER SYSTEM
Filed Dec. 20, 1962  11 Sheets-Sheet 10

INVENTOR.
LESTER E. ERLEWINE

Jan. 4, 1966     L. E. ERLEWINE     3,227,294
TRUCK BODY TRANSFER SYSTEM
Filed Dec. 20, 1962     11 Sheets-Sheet 11
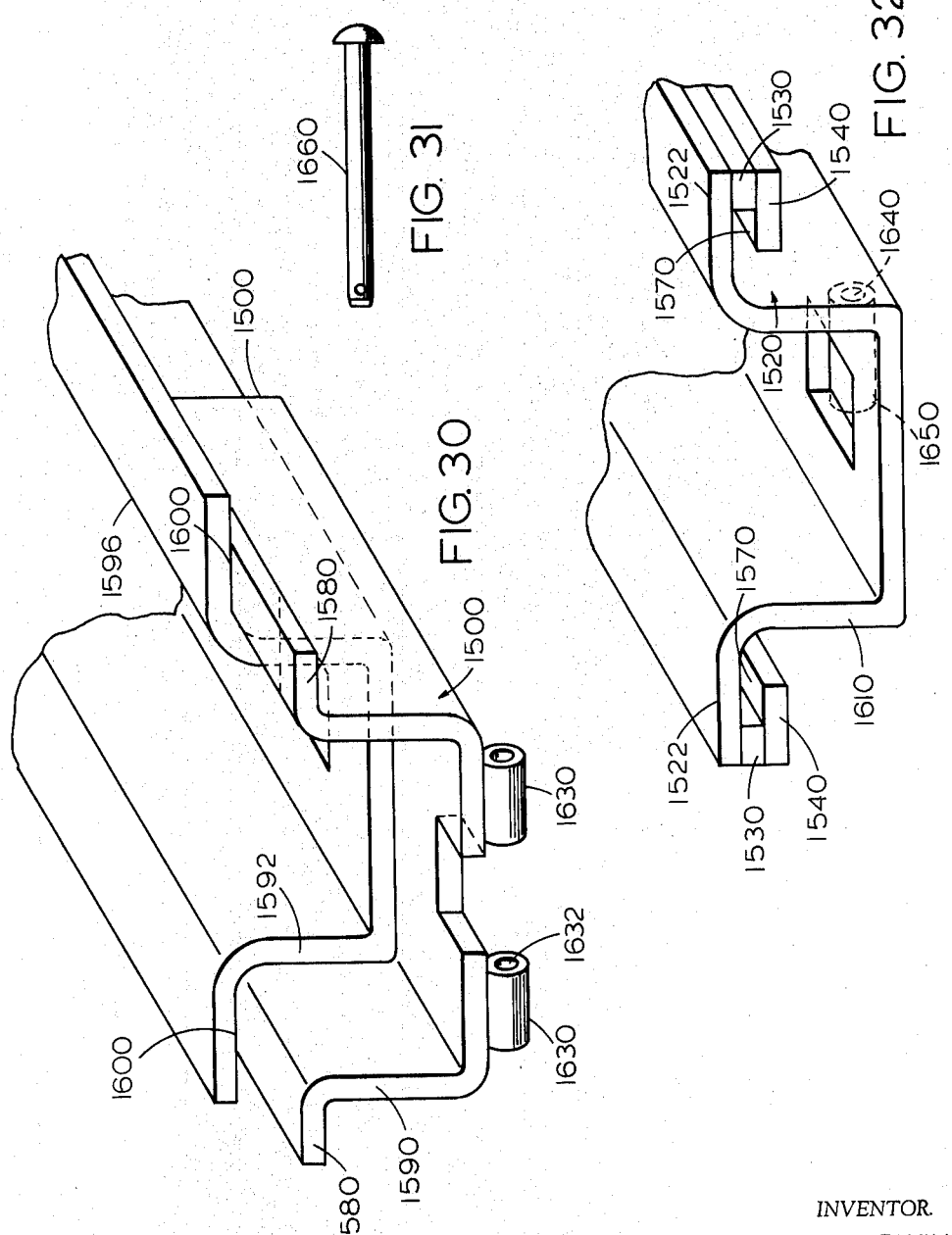
INVENTOR.
LESTER E. ERLEWINE
BY United States Patent Office 3,227,294
Patented Jan. 4, 1966

3,227,294
TRUCK BODY TRANSFER SYSTEM
Lester E. Erlewine, 9731 N. 31st St., Omaha, Nebr.
Filed Dec. 20, 1962, Ser. No. 247,462
3 Claims. (Cl. 214—38)

This invention relates to systems for transferring truck trailer containers from the trailer frames onto railway cars, and more particularly it is an object of this invention to provide a system for accomplishing this transfer with a mechanism involving a far lesser cost.

A further and very important object is to provide a system for accomplishing such a transfer with a minimum amount of space requirement so that a minimum amount of ground space is taken up.

In the prior art, systems for this purpose have been proposed, some systems requiring so much clear space to the side of the railroad car for the maneuvering of the truck from which the container is removed that most railroad yards simply do not have sufficient clear space to accommodate such systems.

Still other prior art systems involve giant gantry cranes. However, these are the most expensive transfer systems now in use and have only been found affordable in a few major terminals.

It is an object of my invention to provide my concept of the combination of multi-section ramps extendable laterally of a truck body and of a railway car in which each ramp has a section permanently mounted on the truck trailer frame and a section permanently mounted on the railway car, with each ramp having a third and laterally movable section which interconnects the truck frame mounted section and the railway car mounted section of the respective ramp, and in further combination with means for firmly and releasably securing the truck trailer frame to the railway car during the transfer operation, and in combination with means for controlling the tilting of the sectional ramps to maintain the tilt of the ramps in positions for the transfer of the tremendous weight of the loaded truck container.

I have discovered that the springs under the railroad car and also the springs under the trailer are so resilient that they cause considerable differences in height between the trailer and the railroad car as the tremendously heavy loaded container is shifted and it is necessary to firmly lock the trailer and car into a union with each other.

I have conceived that there is great difficulty to be expected in making a union between the giant difficult to maneuver truck trailer and the railroad car. It is an object of my invention to provide my concept of the use of fins mounted on either the railroad car or the truck and protruding laterally therefrom and engageable with fin-receiving recess means on the other of the two units with the recesses provided with inwardly converging walls for guiding the fins into locking positions at the interior of the recesses.

Still another object of the invention is to provide my concept of providing means for raising and lowering the car-mounted ramp sections, these being a permanent part of the railroad car, and means for raising and lowering trailer-mounted ramp sections, these being permanently connected to the trailer frame, and in combination with means for preventing the ramps from shifting longitudinally or laterally of the respective trailer and car units under the influence of the tremendous force of the lateral movement of the tons of weight in the laterally shifted container.

Still another object is to provide the use of air bags of the inflatable type mounted on the trailer and car for the raising and lowering of the ramps in a selective fashion to cause tilting of the ramps for employing gravity in assisting in the transfer of the heavy loaded containers.

Still another object is in the provision of the use of height control valve mechanisms operatively correlated with the various air bags at each end of each ramp, and more particularly the height control valves with air bag means at at least two laterally spaced points under each trailer ramp section and also at at least two laterally spaced points under each car ramp section, with a separate height control valve controlling the air bag means at each of said points, and with the height control valves on a given sectional ramp operatively correlatable by manual control, preferably assisted by indicator means for indicating predetermined correlated positions of setting of means controlling each height control valve assembly.

A further objective is to provide my concept of means operatively interconnecting forward and rearward height control valve assemblies which are disposed in corresponding lateral positions one behind the other along the length of the car or trailer whereby a single manual adjustment identically controls those air bags which are disposed at points directly forwardly or rearwardly from each other in the same lateral spacings from the sides of the car or trailer.

A further object of the invention is to provide controllable and raisable ramp means for raising a container upwardly from a car or trailer and out-of-means for supporting the car or trailer and out-of-means for supporting the container during travel, this being as an independent concept from the specific concept of utilizing gravity by the tilting of the ramp as a means for facilitating transfer.

Still another object of the invention is to provide my concept of rows of notches or apertures extending longitudinally of each sectional ramp, used in conjunction with sprockets rotatably mounted on the underside of the container, the combination further including means for rotating the sprockets controllable from a convenient position and means for operably interconnecting the rotatable control mechanism for each sprocket so that all sprockets rotate at the same speed to prevent a binding of sprockets and container supporting roller elements against vertical surfaces of the inclined ramps.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side elevation of a semi-trailer truck of this invention shown with the container removed.

FIGURE 2 is a top plan view of the parts shown in FIGURE 1.

FIGURE 3 is a side elevational of a railway car in accordance with the system of this invention.

FIGURE 4 is a left end view of the parts shown in FIGURE 3.

FIGURE 5 is a top plan view of the car of FIGURE 3.

FIGURE 6 is a side view of the semi-trailer and tractor assembly of this invention shown with the container in place on the trailer.

FIGURE 7 is a top plan view of a semi-trailer and tractor shown in the position of container-loading connection with a railway car of this invention, parts of adjacent cars being shown.

3

FIGURE 8 is a bottom plan view of the container of this invention.

FIGURE 9 is a view-in-section taken along the line 9—9 of FIGURE 8.

FIGURE 10 is a sectional view taken along the line 10—10 of FIGURE 8.

FIGURE 11 is a rear end view of a semi-trailer shown in loading connection with a railway car of this invention, the view not showing, however, certain interlocking mechanisms seen in FIGURES 3 and 4, the container in FIGURE 11 being in a level position for road travel on its trailer.

FIGURE 12 is a view similar to FIGURE 11 in which the container has been raised and tilted.

FIGURE 13 is a view similar to FIGURE 12 in which the container has been moved to a point of transfer from the trailer to the railway car.

FIGURE 14 is a view similar to FIGURE 11 in which the container has been completely transferred to the railway car, but in which the ramp means of this invention is still in a tilted position.

FIGURE 15 shows the parts substantially as FIGURE 14, but in which the ramp means have been leveled and the container has been settled into a road travel position with respect to the railway car.

FIGURE 16 is a detailed top plan view of the interconnecting portions of a section of the trailer and railway car interlocking means, portions of adjacent trailer and railway car being shown.

FIGURE 17 is a sectional view taken along the line 17—17 of FIGURE 16.

FIGURE 18 is a side elevation of a latching mechanism interconnecting portions of a railway car frame or a trailer frame and adjacent side portions of a container, and an unlatched position of the latching mechanism being shown in dotted lines.

FIGURE 19 is a sectional view taken along the line 19—19 of FIGURE 18.

FIGURE 20 is a top plan view of a section of the trailer frame or of the railway car of this invention, shown with a ramp section and associated ramp section elevating and lowering mechanism attached thereto, certain of the latter being shown in dotted lines.

FIGURE 21 is a sectional view taken along the line 21—21 of FIGURE 20.

FIGURE 22 is a sectional view taken along the line 22—22 of FIGURE 20.

FIGURE 23 is a sectional view taken along the line 23—23 of FIGURE 20, and with dotted lines showing a tilted position of the respective ramp section.

FIGURE 24 is a top plan detail of adjacent ends of a trailer and a railway car mounted sections respectively of a sectional ramp, shown as interconnected by a central and interconnecting ramp section.

FIGURE 25 is a sectional view taken along the line 25—25 of FIGURE 24.

FIGURE 26 is a perspective view of the central or interconnecting ramp section of this invention.

Figure 27:
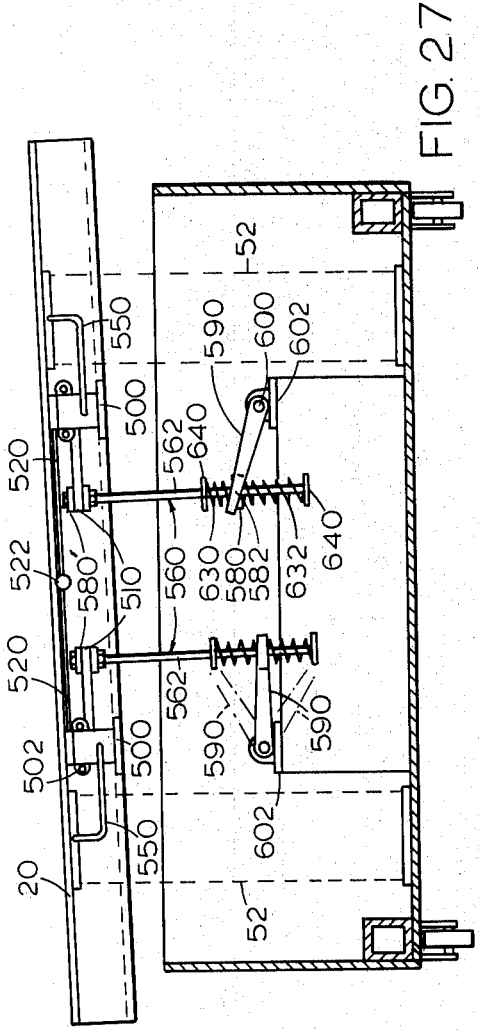

FIGURE 27 is a sectional view taken along the line 27—27 of FIGURE 7 showing an upper part of a railway car constructed in accordance with this invention. The view is diagrammatic and shows the ramp height control system used on the railway car. This same view is suitable for illustrating the upper equivalent portion of a truck trailer frame for showing an identical ramp height control system used on the truck trailer frame. Certain features are shown in dotted lines.

Figure 28:
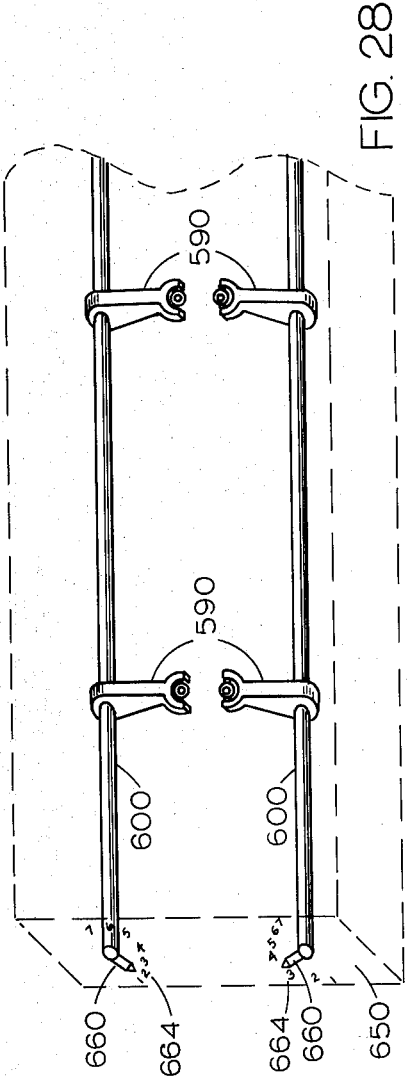

FIGURE 28 is a diagrammatic perspective view of approximately the rearward two-thirds of a railway car upper portion, the general outlines of the upper portion of the railway car being shown in dotted lines. The view showing diagrammatically in full lines the rods and setting levers which pre-set the desired height of the ramp sections of the railway car, certain control valves for expandable air bags of the ramp height control system, not being shown.

Figure 29:
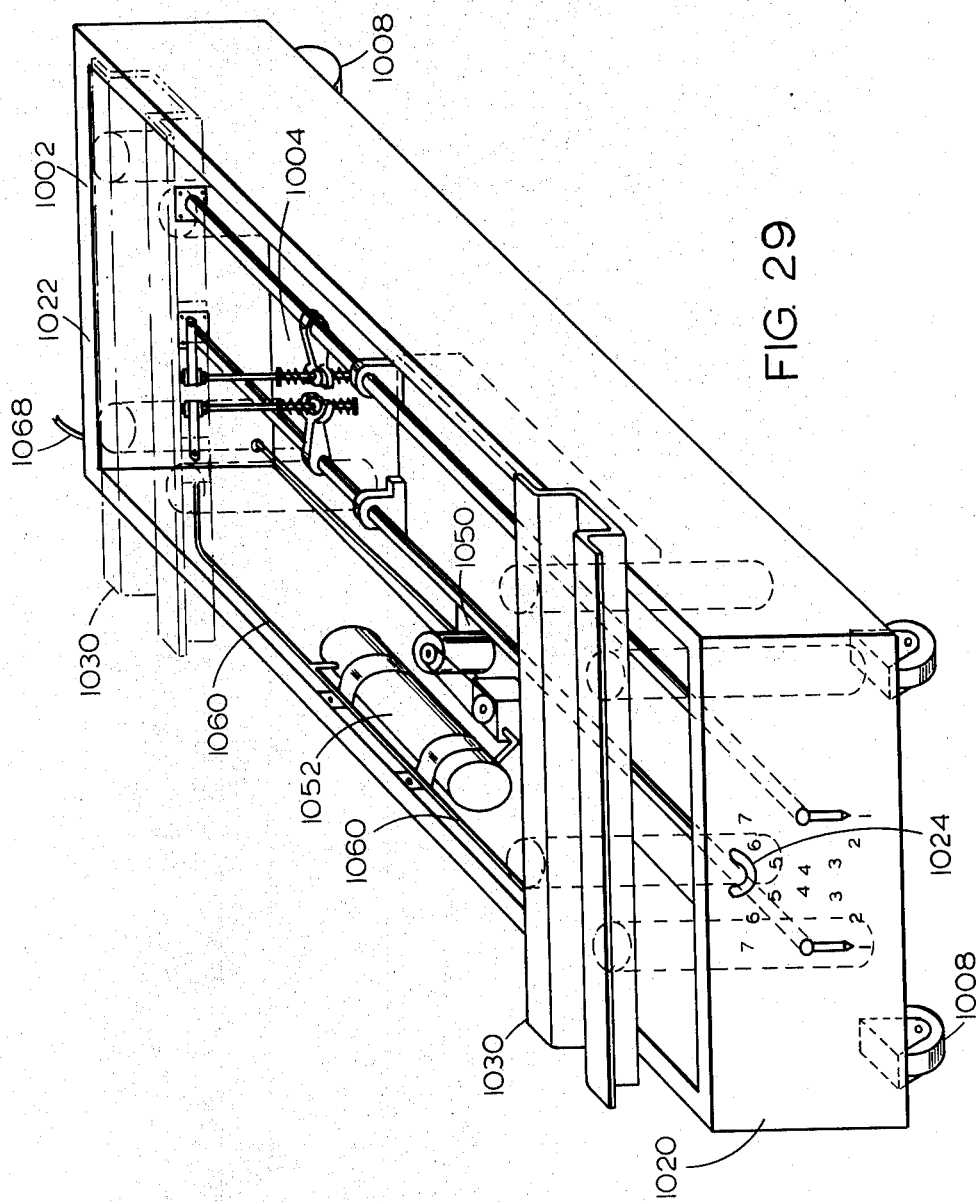

FIGURE 29 is a top perspective view of a transfer dolly of this invention. The view is diagrammatic and one of the ramp sections is shown in dotted lines.

FIGURE 30 shows a modification of the end of a plug ramp section.

FIGURE 31 shows a pin used with the plug ramp section of FIGURE 30.

FIGURE 32 shows the end of a receptacle section used with the plug ramp section of FIGURE 30.

The container transfer system of this invention has a special semi-trailer generally indicated at 10 in FIGURE 1 shown at attached to a truck 11 which latter is of an ordinary sort having an available source of air pressure, not shown, and normally used for the air brakes thereof.

The trailer 10 has a frame generally indicated at 12 supported by a landing gear assembly 20' of a conventional nature for supporting the forward end of the frame 12.

In accordance with this invention, the trailer 10 is provided with trailer mounted sections 20 of sectional ramps further later described and generally indicated at 24.

It will be seen that the trailer mounted ramp sections 20 are disposed at considerable longitudinal spacing on the trailer whereby one of them is under a rearward portion of a load-carrying trailer container generally indicated at 50 and also especially constructed in accordance with the system of this invention, and shown in FIGURE 6.

Referring to FIGURE 20, a top plan view in detail is there shown of a section of the trailer frame 12 shown with the trailer mounted ramp section 20 attached thereto, and it will be seen in FIGURES 2 and 20 that each ramp section 20 is elongated laterally of the longitudinally elongated trailer frame 12 and that the ramp sections 20 are each substantially preferably as long as the trailer frame 12 is wide.

Referring to FIGURE 21, it will be seen that the ramp sections 20 are of substantially a U-shape in their center portion 38 for providing an upwardly opening longitudinally extending track recess 40 on the upper side of each ramp section 20.

Each ramp section 20 further has horizontally extending flanges 44 having horizontal upper and lower surfaces 46 and 48.

The lower surfaces 48 are engaged by horizontally extending plates 50 fixed to the upper sides of vertically expandable and contractable air bag assemblies 52 which latter have under-surfaces supported upon an air bag supporting platform 58 which latter is secured to adjacent portions of the trailer frame 12 in any suitable manner.

The air bag supporting platform 58 extends under four air bag assemblies 52 associated with each trailer mounted ramp section 20. The four air bag assemblies 52 are disposed in two pairs, one pair being disposed on the forward and rearward sides of the ramp section 20 and on the lefthand side thereof and the other pair being disposed on the forward and rearward sides of the ramp section 20 and on the righthand side thereof, with the air bags of a pair disposed preferably directly forwardly and rearwardly of each other with respect to the longitudinal length of the trailer 12.

Means are provided for preventing the ramp assembly 20 from moving excessively in directions forwardly and rearwardly of the trailer frame 12 and also excessively in directions from side to side thereof, such means could, for example, be a pair of stabilizer plates 60 disposed forwardly and rearwardly of each other respectively, with the plates extending in planes extending vertically and also at a right angle to the longitudinal length of the trailer 12, with the forward and rearward sides of the plate 60 being disposed in parallelism, and with the plates 60 extending downwardly through suitable notches in the air bag supporting platform 58, these notches being shown at 70.

Referring now to FIGURE 6, it will be seen that the trailer container 30 is received on the trailer frame 12 and is well supported inasmuch as the trailer frame 12 has upper surface portions 80 which are disposed in horizontal planes for engaging undersurface portions of the trailer container 30 which are also horizontally disposed, the said undersurface portions 80, preferably all being in the same horizontal plane as indicated at 84 in FIGURE 6.

As best seen in FIGURE 23, each trailer mounted ramp section 20 is preferably received in a recess 90 extending laterally of the trailer, and the frame 12 preferably has portions which extend upwardly beyond certain lowermost positions of the upper surfaces of the ramp sections 20. This is so that the upper surfaces of the frame sections 100 tend to support the container 30 during normal road travel when support from the ramp sections 20 has been removed by removal of air pressure from the air bag assemblies 52.

Referring to FIGURE 6, and also to FIGURES 18 and 19, it will be seen that the container 30 is maintained in place on the trailer frame 12 by suitable means such as latches 120 pivotally mounted on bolts 122 to the frame 12 and adapted to swing from full lines position shown in FIGURE 18 to the dotted lines position shown in FIGURE 18 for respectively holding the container 30 from moving laterally and for storage.

In a storage position, the horizontal latch 120 is upheld by a pin 128 fixed to the frame 12. In the vertical position, the latch 120 is held from excessive swinging by a pin 130 fixed to the frame 12 and in a position for engaging the rearward side of the latch 120 when it is in vertical position.

The latch 120 has on its upper end an inwardly extending lock flange 136 which latter has an arcuate undersurface 138 adapted to engage an arcuate upper surface 140 of a lug 150 fixed to the side of the container 30, whereby when the latch is in its upper full line position shown in FIGURE 18, the arcuate undersurface 138 thereof will engage the lug 150 for preventing the container from rising off of the trailer frame 12.

It will be seen that the latch mechanism illustrated in FIGURES 18 and 19 are shown by way of example only and that many other mechanisms accomplishing this purpose may be preferred.

Referring to FIGURE 7 and also to FIGURES 16 and 17, means are there shown for interlocking the trailer frame 12 and a railway car 170, such interconnection means being generally indicated at 174 and embodying pins 180 extending outwardly from the sides of the trailer frame 12, the pins 180 being secured to the trailer frame 12 threadedly and the pins 180 being firmly fixed in place by nuts 182. The outer ends of the pins 180 are provided with heads 184 of larger diameter. It will be seen that the pins 180 can be removed from the frame 12 and would be removed in order to reduce lateral width to within the law required width limit for use on the roadway.

However, during interconnection and transfer, the pins are in place as shown in FIGURE 6 and are adapted to engage in notches 184 of notch plates 188 which latter have generally vertical sides and are elongated forwardly and rearwardly with respect to the elongated railway car 170.

On the railway car side of each plate 188 are lugs 190 fixed to the plate 188, the lugs 190 receiving a bolt 192 which extends downwardly therethrough and also through a track mounted member 200 which latter is received in a track comprising brackets 210 and 212 which latter are disposed above and below the track mounted member 200, and it will be seen that in FIGURE 7, the track brackets 212 extend a considerable part of the total length of the railway car 170 and are fixed thereto.

The track mounted member 200 has a portion for moving longitudinally of the track brackets 212 and being maintained inside thereof, and that inner portion is generally shown at 220.

The track mounted member 200 further has an outwardly protruding portion 230 which extends outwardly from between the horizontal outer edges of the track brackets 212 and which receive the bolt 192 therethrough.

A bolt 240 extends through one of the track brackets 210 and is threaded with respect thereto and is adapted to engage the track member 200 for fixing it in a desired position with respect to the track bracket 212 to longitudinally fix the position of the notch plate 188 for cooperation with the respective pin 180.

Referring to FIGURE 7, it will be seen that two of the notch plates 188 and associated mechanism for attaching them to the track brackets 212 are used with each railway car 170 for receiving respective ones of two pins 184, and the notch plates 188 are preferably longitudinally spaced a great distance apart.

It will be seen that the notch plates 188 can be turned upside down in order to cause the generally horizontally extending notches 184 therein to have their open ends then not at the forward side of the notch plate 188 as shown in FIGURE 17, but instead, at the rearward side of the notch plate 188 in order that the pins 184 could enter the notch plate from the rearward side as might be preferred at certain times for the convenience in maneuvering the semi-trailer if there are obstacles in the way of normal maneuver.

By normal maneuvering, it is meant that with the notch plates in the positions shown in FIGURES 7 and 17, the notches 184 forward ends which, as best seen in FIGURE 3, are vertically wider for ease of reception of the pins 180, than are the inner ends of the notches 184 which latter are preferably of a vertical dimension for a snug fit against the pins 180. As best seen in FIGURE 7, the semi-trailer is normally backed up into place for reception of the pins 180 into forwardly opening notches 184 in the notch plates 188.

Referring to FIGURE 7, it will be seen that the railway car has ramp sections 220 which are identical to ramp sections 20 of the trailer. The ramp sections 220 of the railway car are elevated by air bag assemblies, not especially shown, inasmuch as FIGURES 20 and 21, and also FIGURES 22 and 23, all can be considered to illustrate not only the frame of the trailer, but also the frame of the railway car as the frames of both can be identical to the extent encompassed by the concepts of this invention.

Accordingly, FIGURES 20–23 can be considered to apply equally to the railway car as to the trailer.

Accordingly, referring to FIGURE 7, when the trailer 10 is disposed alongside and connected to the railway car 170, the respective ramp sections 220 of the railway car will be aligned with ramp sections 20 of the trailer and the space between the ramp sections is filled by a pair of central or connector ramp sections generally indicated in FIGURES 24–26 at 270.

It will be seen that the central or connector ramp sections 270 have two sides 272 which are spaced apart a distance for reception between and against the inner sides of the sidewalls 38 and 40 of a sprocket roller receiving recess in the upper side of each of the rail sections 220.

Referring to FIGURE 26, it will be seen that the central ramp sections have bottom portions 278 which latter are provided with a longitudinal row of notches or openings 280 which latter are of a spacing identical to and of a size identical to certain notches or holes 290 to be found in the ramp sections 20 and 220 respectively.

As thus described, the notches or holes 280 and 290 in interconnected ramp sections form one continuous complete row of spaced openings of identical size and spacing for the reception therein of one of a group of sprockets 300, as best seen in FIGURES 8 and 9.

Referring to FIGURES 8 and 9, the sprockets 300 are shown to be a forward pair of sprockets and a rearward pair of sprockets. The forward pair of sprockets 300 are disposed on respective longitudinally extending horizontal parallel shafts 310 which latter are rotatably mounted on the underside of the container 30 by bearings 340 and the shaft 310 are interconnected by a sprocket and chain assembly generally indicated 350 which latter is adapted to cause the shaft 310 to rotate in exact unison. Moreover, the teeth of the sprocket 300 are disposed in exactly the same rotational relationship whereby at times when the shaft 300 is rotated, the container 30 will tend to move along the sectional ramps formed by the sections 20, 220, and 270 respectively.

The forward end of one of the shafts 310 extend outwardly beyond the forward end of the container 30 and is there provided with a preferably hexagonal fixed portion 380 which latter is adapted to receive a socket 388 of a pneumatic wrench 390 in a manner such that the wrench 390 will cause rotation of the respective shaft 310 when it is turned on. The handle 400 of the wrench 390 can be held in the hand of an operator. It may seem that this is a small tool for rotating shafts to propel such a large object as a loaded container, but it will be understood that at such a time, the ramps would be in a position for downward inclination toward the direction in which it is intended that the container shall move whereby gravity assists this motion. It will be understood that the wrench 390 is of an impact type and that these develop tremendous power even though they can be held in the hand.

Referring to FIGURE 9, it will be seen that the underside of the container 30 has open space 420 in which the shafts 310 and associated mechanisms are received and that this space is disposed beneath the floor 422 of the container which is normally loaded with a load of many tons disposed in the area 430.

Referring to FIGURE 11, it will be seen that at the time the car and trailer are interconnected, although interconnecting means is for convenience not shown in FIGURES 11-15, the height of the road bed under the wheels of the trailer, as shown at 500, will be spaced substantially at the same level as the upper surfaces of the rails 510 disposed beneath the railway car 170, the rails being shown at 510. The steps of a transfer from a truck to the railway car are shown in FIGURES 11-15. In FIGURE 11, the container 30 is in position on the truck, and the ramp sections 20 thereof, not shown in this view, are connected by the central ramp sections 270 to the ramp sections 220.

In FIGURE 12, the air bag assemblies 52 under the ramp sections 20 and 220 have been operated for causing both ramp sections to be raised and tilted downwardly toward the railway car. In FIGURE 13, sufficient application of rotational power to the sprocket 300 has been applied by the wrench 390 as to have caused the container 30 in the mid-point of transfer.

In FIGURE 14, the container 30 is completely on the railway car and the air bags are being deflated for lowering the container so that it is upheld in FIGURE 15 on the railway car frame and no longer supported by the air bags and ramp sections of the railway car, whereupon the connection or central ramp sections 270 can then be removed, as the transfer is complete and disconnection of the trailer from the railway car can be made.

It will be seen that in operation, a transfer from the railway car to the trailer is simply a matter of reversal of the same steps above described.

Referring to FIGURE 8, it will be seen that the entire weight of the container 30 when loaded should not be supported on the sprockets 300, and so by way of example, rollers 580 are shown rotatably mounted by mounting assemblies 582 on the underside of the floor 422 of the container 30, the rollers 580 being adapted to be received between the inner sides of the walls 38 and 40 of the respective ramp sections 20, 220, or 270. The rollers 580 and their particular positions shown in FIGURE 8 are by way of example only as it will be seen that many rollers are to be needed to support the great weight.

Referring to FIGURE 27, a cross-section taken along the line 27—27 of the railway car of FIGURE 7 is there shown. It will be seen that FIGURE 27 is taken in the same position as FIGURE 23 and that both of these views show the air bags 52, these being shown in an expanded position in FIGURE 27 in dotted lines diagrammatically.

The upper ends of the air bags are positioned to force upwardly on the respective ramp section 20 as they are anchored to the underside thereof by suitable means.

Control valves for the air springs 52 of FIGURE 27 are seen at 500, and these valves are fixed by bolts 502 to the ramp section 20. Each valve 500 has an operating lever 510 which extends inwardly therefrom in substantially a horizontal way. Each operating lever 510 is pivotally secured to its respective control valve 500 in a way for the upward and downward movement of the outer ends of the operating lever 510.

It will be understood that the control valves 500 can be valves of the type sold by the Bendix-Westinghouse Automotive Air Brake Company with general offices and plant at Elyra, Ohio, and branches at Berkely, California, and Oklahoma City, Oklahoma. These control valves are generally available on the open market and are such as described on their catalog page labeled "Catalog 12L2. However, for the general purposes of this application, detailed description of the valve should not be necessary. It should be sufficient to say that these valves operate as will be described herein.

It will be understood that each valve 500 has a compressed air or pneumatic input line 520 which is connected to a general feeder line 522, as seen in FIGURE 27, the general feeder line 522 also being visible in FIGURE 7, the latter connecting to suitable means in the frontal area of the trailer frame 10, such means not being shown, but such means being characterized as receiving compressed air from a transfer line 530, best seen in FIGURE 7, which connects to suitable means placing it in operable connection with an air compressor attached to the engine of the truck, as seen in FIGURE 6, these parts not being shown as they are conventional.

The lines 522 and 520 deliver compressed air to the valves 500 which, in turn, deliver the compressed air to outlet lines 550 leading to the air bags 52 for pumping them up to expand them at desired times.

The operating levers 510 control the passage of air from the lines 520 to the 550 and the position of these operating levers 510 is regulated by means now to be described, and generally indicated at 560.

The control means 560 comprises rods 562, each of which is secured to the free end of the respective operating lever 510 with a flexible connection achieved by rubber grommets 580' disposed between the levers 510 and nuts which are disposed on the rods 562, which latter pass through apertures not shown in the levers 510.

The lower ends of the rods 562 extend through suitable apertures which extend vertically through generally horizontal discs 580 which latter receive the rods 562 slidably. Each disc 580 is supported in a yoke 582.

Each yoke 582 connects to its disc 580 in a manner for supporting the disc 580 for free pivoting along an axis disposed generally horizontally at times when the arms 590 to which the yokes 582 are attached are disposed horizontally, such axes each being disposed at an angle of 90 degrees with respect to each arm 590, and each arm 590 extending inwardly at 90 degrees as seen in top plan view.

However, as seen in rear elevation in FIGURE 27, each arm 590 is adapted to swing upwardly and downwardly at its inner end about a horizontal axis defined by the attachment of the outer ends of each arm 590 to a respective one of two longitudinal control rods 600, which as best seen in FIGURE 28, extend substantially the entire length of the railway car. The rods 600 are mounted in a horizontal position for rotation about their axes in pillow blocks 602 attached by suitable means to the frame of the railway car, such suitable means not being shown.

Now referring to the rods 562 again, it will be seen that they extend through apertures 620 in the discs 580 in a slidable fashion and that springs 630 and 632 are disposed respectively above and below each disc 620 and are disposed about the respective rods 562 and are maintained in position for pressing against the discs 580 from the top and the bottom respectively by certain nuts 640 which are threadedly fixed on the vertical rods 562.

Referring now to FIGURE 28, it will be seen that the longitudinal rods 600 extend outwardly of the rearward side 650 of the railway car and that the rods 600 have transversely extending inwardly pointing indicator control levers 660 thereon whereby an operator at the rearward side of the railway car can set the control levers 660 at certain numerals 664 which latter are disposed in two groups, one by each indicator control lever 660, the numerals 664 each being arranged in a semi-circle for indicating the angle of rotation of the respective longitudinal rods 600 whereby by a setting of the operating levers 660 opposite a respective number of the numerals 664, the rotational position of the longitudinal rods can be controlled.

Referring to FIGURE 7 then, it will be seen that if the right end of the ramp section 20 is desired to be in a raised position with respect to the left end, then it is necessary to move the lever 510 upwardly for controlling the right hand valve 500, this upward movement being accomplished by an upward movement of the vertical rod 562 as urged upwardly by the spring 630, pressed upwardly by the disc 580, the latter pressed upwardly by the lever 590, the latter being moved upwardly at its inner end by rotation of the shaft 600 to which it is attached, and the rotational position of the shaft 600 is controlled in the first place by the indicator control lever 660 to which it is attached.

As thus described, the variable spacing of the ends of each ramp section 20 with respect to the horizontal can be achieved.

It will be seen that for each railway car four of the valves 500 are used, one for each end of each ramp section, each for controlling four air bags 52 disposed one at each end of each ramp section.

Referring again to FIGURE 27, it will be seen that the upper spring 630 on a rod 562 is compressed when the arm 590 is upward, and at this same time, the spring 632 on the lower side of the same disc 580 is expanded. This permits the arm 590 to have a great amount of motion without the necessity of an equally great amount of motion of the respective control valve operating lever 510. Thereby the respective arm 590 can be in a lower position much lower than might immediately be supposed in order that it will be down and out of the way at times when the ramp section is settled into its storage position in the rail way car frame. For this reason, certain lower and upper dotted line positions of the arms 590 are shown in FIGURE 27, and the left arm 590 is shown horizontally at the same time that the right arm 590 is in an upper position at its inner end because it is desired that the right hand side of the ramp section 20 be higher than the left hand side in order that the container be free to slide down the ramp onto the railway car as earlier described.

It will be seen that for all parts described in FIGURES 27 and 28, the equivalent parts in both description and number and positions are used on the truck-trailer frame for controlling the trailer-mounted ramp section. As both of these structures are the same, it is believed that it is unnecessary to duplicate and the FIGURES 27 and 28 will illustrate both ramp sections height control assemblies, not only for the railway car, but also for the truck-trailer.

Referring to FIGURE 29, a transfer dolly is there generally indicated at 1000 having a rectangular frame 1002 provided with a floor 1004 to the underside of which four caster wheel assemblies 1008 are connected for supporting the frame 1002.

At each end 1020 and 1022 of the frame 1002 are towing eyes 1024 fixed to the frame and to which a suitable tractor or towing vehicle can be connected.

The transfer dolly 1000 is elongated from its rearward end 1020 to its forward end 1022 and it has two ramp sections 1030 disposed thereacross, one of which is shown in dotted lines in FIGURE 29.

The tilting mechanism for the ramp section 1030 is identical to that described in FIGURE 27, and therefore, identical to that used in both the railway car and the trailer earlier described, with the single exception that in the transfer dolly 1000, a portable compressor kit generally indicated at 1050 and having a compressed air tank 1052 supplies the compressed air to lines 1060 extending forwardly and rearwardly from the compressor kit 1050 which serve as substitutes for the compressed air line 522 and 520 of FIGURE 27 for supplying compressed air to the respective control valves 500 which are mounted on the dolly 1000 identically to the way they are mounted on the railway car and trailer. The portable compressed air unit 1050 also supplies compressed air to the railway car through a compressed air line 1068 connected to a line 1060. The remainder of the line 1068 is broken away and it will be understood that its remainder continues over to a railway car in identical fashion to the line 522 of FIGURE 7.

In operation, the dolly 1000 can be placed alongside a railway car and the ramp sections of each can be interconnected identically to the earlier described interconnection methods of trailer and railway car ramp section whereupon by identical means a transfer of a container can be affected from the railway car onto the transfer dolly 1000. Thereafter, the dolly ramps can be disconnected from the railway car ramp and the dolly can be towed, for example, into a refrigerated warehouse or other warehouse for storage of the container independently and apart from a truck-trailer, whereby the latter two types of vehicles are free for other uses and are not tied up during storage of the container.

Referring now to FIGURE 30, it will be seen that a ramp section which shall be called a plug section 1500 can be used in substitution for the ramp section 20 of FIGURES 24 and 25. Referring to FIGURE 32, a receptacle ramp section 1520 is there shown which latter has out-turned flanges 1522 and these have filler strips 1530 attached to the underside of their outer ends and extend longitudinally and connect track strips 1540 to the underside of the respective flanges 1522, which latter are horizontal whereby track recesses 1570 are provided which latter extend longitudinally of the ramp section 1520 and are adapted to receive therein the outer terminal edges 1580 of a connection portion 1590 of the plug ramp section 1500, shown in FIGURE 30.

The connection section 1590 underlaps a terminal end 1592 of the main portion 1596 of the plug ramp section 1500, and is suitably secured thereto such as by welding or the like at 1600.

It is to be understood that at a time when the connection portion 1580 of the ramp section 1500 is inserted into the recess 1570 of ramp section 1520 until the terminal end 1610 of receptacle section 1520 is in abutment with the end 1592 of the main portion 1596 of the section 1500, then at that time, certain annular members 1630 fixed to the outer end of the connection portion 1590 will be disposed with their openings 1632 in registry with the openings 1640 of a mating annular connector 1650, best seen in FIGURE 32, whereby a pin 1660, seen in FIGURE 31, can be inserted through the annular members 1630 and 1650 to hold the end of each ramp section 1500 securely in place against the end of the ramp section 1520.

It will be seen that the respective ends of ramp sections shown in FIGURES 30 and 32 can be substituted directly for the ends of sections 20 and 220 shown in FIGURE 24 making possible the elimination of a loose part, namely, the connection section 270 of FIGURE 24 and with the attainment of greater strength of construction.

From the foregoing description, it is thought to be obvious that a truck body transfer system constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. In combination: a body having an elongated frame, upper portions of said frame being adapted for supporting a cargo container, a plurality of normally generally horizontally extending ramps extending transversely of said frame, elevatable and lowerable ramp elevating means disposed beneath said ramps, said frame supporting said elevating means, a cargo container, said frame and said cargo container having abutted surfaces so positioned at times when said ramps are in lowered positions as to cause said abutted surfaces to support those parts of said container which are disposed above said ramps so as to permit substantially only said frame to support said cargo container and not said ramps at times when said elevating means is in a downwardly retracted position for rigidity of support of said container during travel, said elevating means being of a size for upholding said container above said frame when said elevating means is in an elevated position upholding said frame, said elevating means having separate elevated portions disposed spaced apart along the length of a respective ramp, the respective spaced parts of said elevating means being operably connected to the respective ramp, and the respective spaced parts of the elevating means connected to a respective ramp having upper portions, the upper portions of said spaced elevating means connected to a given ramp being raisable and lowerable with respect to each other so as to control the angle of tilt of the respective ramp means whereby the tilting of said ramps can facilitate sliding of said cargo container longitudinally of said ramps for delivery of said containers away from said body, said elevatable and lowerable ramps each being provided with a longitudinal row of openings therethrough, and in which said cargo container is provided with sprocket wheels rotatably mounted on the underside of said container in a manner for supporting said container, some of said sprockets engaging one of said ramps and some of said sprockets engaging the other of said ramps, and means interconnecting sprockets engaging one of said ramps with the sprockets engaging the other of said ramps for the simultaneous synchronized rotation thereof, and said sprockets all being of the same size for the uniform movement of said cargo container lengthwise of said ramps.

2. In combination: a body having an elongated frame, upper portions of said frame being adapted for supporting a cargo container, a plurality of normally generally horizontally extending ramps extending transversely of said frame, elevatable and lowerable ramp elevating means disposed beneath said ramps, said frame supporting said elevating means, a cargo container, said frame and said cargo container having abutted surfaces so positioned at times when said ramps are in lowered positions as to cause said abutted surfaces to support those parts of said container which are disposed above said ramps so as to permit substantially only said frame to support said cargo container and not said ramps at times when said elevating means is in a downwardly retracted position for rigidity of support of said container during travel, said elevating means being of a size for upholding said container above said frame when said elevating means is in an elevated position upholding said frame, said elevating means having separate elevated portions disposed spaced apart along the length of a respective ramp, the respective spaced parts of said elevating means being operably connected to the respective ramp, and the respective spaced parts of the elevating means connected to a respective ramp having upper portions, the upper portions of said spaced elevating means connected to a given ramp being raisable and lowerable with respect to each other so as to control the angle of tilt of the respective ramp means whereby the tilting of said ramps can facilitate sliding of said cargo container longitudinally of said ramps for delivery of said containers away from said body, said elevatable and lowerable ramps each being provided with a longitudinal row of openings therethrough, and in which said cargo container is provided with sprocket wheels rotatably mounted on the underside of said container in a manner for supporting said container, some of said sprockets engaging one of said ramps and some of said sprockets engaging the other of said ramps, and means interconnecting sprockets engaging one of said ramps with the sprockets engaging the other of said ramps for the simultaneous synchronized rotation thereof, and said sprockets all being of the same size for the uniform movement of said cargo container lengthwise of said ramps, said means interconnecting and synchronizing said sprockets comprising a shaft projecting outwardly of the frame of said vehicle body whereby a means for applying a force to rotate said shaft can be applied to the outer end of said shaft.

3. In combination: a body having an elongated frame, upper portions of said frame being adapted for supporting a cargo container, a plurality of normally generally horizontally extending ramps extending transversely of said frame, elevatable and lowerable ramp elevating means disposed beneath said ramps, said frame supporting said elevating means, a cargo container, said frame and said cargo container having abutted surfaces so positioned at times when said ramps are in lowered positions as to cause said abutted surfaces to support those parts of said container which are disposed above said ramps so as to permit substantially only said frame to support said cargo container and not said ramps at times when said elevating means is in a downwardly retracted position for rigidity of support of said container during travel, said elevating means being of a size for upholding said container above said frame when said elevating means is in an elevated position upholding said frame, said elevating means having separate elevated portions disposed spaced apart along the length of a respective ramp, the respective spaced parts of said elevating means being operably connected to the respective ramp, and the respective spaced parts of the elevating means connected to a respective ramp having upper portions, the upper portions of said spaced elevating means connected to a given ramp being raisable and lowerable with respect to each other so as to control the angle of tilt of the respective ramp means whereby the tilting of said ramps can facilitate sliding of said cargo container longitudinally of said ramps for delivery of said containers away from said body, wheels supporting said frame so that a first vehicle is thus defined, a second wheeled vehicle of a construction as described above about said first vehicle, said vehicles being elongated with sides and ends, the sides of said vehicles being parallel to lines of draft of said vehicles, said vehicles being disposed alongside each other with a certain side of one vehicle facing a certain side of the other vehicle, a vehicle connection assembly disposed between said certain sides, said connection assembly having interfitting sections which are adapted to be received one in the other, said sections having engageable surfaces so operatively correlated and disposed as to guide one of said sections both vertically and horizontally relative to the other section as one of said two vehicles is moved longitudinally with respect to the other, said guiding being toward a resting place of said one interfitting section in the other of said sections in which resting place said sections are vertically pivotable and relatively immobile with respect to each other as regards vertical and horizontal movement relative to each other and as regards horizontal movement with respect to each other in any but one horizontal direction extending generally longitudinally of said vehicles, the interfitting sections of said connection assembly being attached one to each of said vehicles, a second vehicle connection assembly substantially spaced for effectively coupling said certain vehicle sides for synchronized vertical movements, said second vehicle connection assembly having interfitting sections attached one to each of said vehicles, said second vehicle connection assembly being of like description to said first vehicle connection assembly with the exception that the second connection assembly is not limited in its operation to the preventing of movement of its sections horizontally away from each other.

References Cited by the Examiner

UNITED STATES PATENTS

| | | | |
|---|---|---|---|
| 1,148,531 | 8/1915 | Oldham | 214—38.22 |
| 1,851,502 | 3/1932 | Ferris et al. | 214—16.12 X |
| 1,942,022 | 1/1934 | Farries | 214—38.8 X |
| 2,021,503 | 11/1935 | Fildes | 214—38.40 X |
| 2,150,371 | 3/1939 | Furnish | 214—38.22 |
| 2,304,115 | 12/1942 | Norbom | 214—85 |
| 2,691,450 | 10/1954 | Rosenbaum | 214—516 X |
| 2,714,967 | 4/1955 | Olsen | 214—38.40 |
| 2,729,352 | 1/1956 | Hodges et al. | 214—516 |
| 2,849,129 | 8/1958 | Likens | 214—38.20 |
| 2,856,085 | 10/1958 | Ryan | 214—38.8 |
| 2,929,520 | 3/1960 | Mellam | 214—15 |
| 3,095,987 | 7/1963 | Sable | 214—38.10 |

GERALD M. FORLENZA, *Primary Examiner.*

HUGO O. SCHULZ, *Examiner.*